US007377514B1

(12) United States Patent
Timpano et al.

(10) Patent No.: US 7,377,514 B1
(45) Date of Patent: May 27, 2008

(54) PROPOSITION WAGER FOR A CARD GAME

(76) Inventors: Bruno Michael Timpano, 27 Lewis Drive, Orillia, Ontario (CA) L3V 7S3; Arthur Manfredi, 58 Cowan Avenue, Toronto, Ontario (CA) M6K 2N4

( * ) Notice: Subject to any disclaimer, the term of this patent is extended or adjusted under 35 U.S.C. 154(b) by 50 days.

(21) Appl. No.: 11/366,962

(22) Filed: Mar. 1, 2006

Related U.S. Application Data

(60) Provisional application No. 60/684,004, filed on May 23, 2005.

(51) Int. Cl.
*A63F 1/00* (2006.01)
*A63F 13/00* (2006.01)

(52) U.S. Cl. ......................... 273/292; 273/274; 463/13

(58) Field of Classification Search ................ 273/292, 273/274, 309; 463/13, 12
See application file for complete search history.

(56) References Cited

U.S. PATENT DOCUMENTS 5,226,661 A * 7/1993 Wolf .......................... 273/274
5,732,950 A 3/1998 Moody
5,823,873 A 10/1998 Moody
6,007,066 A 12/1999 Moody
6,102,402 A 8/2000 Scott et al.
6,299,170 B1 10/2001 Yoseloff
6,386,973 B1 5/2002 Yoseloff
6,533,279 B2 * 3/2003 Moody et al. .............. 273/292
6,827,348 B1 12/2004 Mitchell
6,896,265 B1 5/2005 Schlumbrecht
6,929,264 B2 8/2005 Huard et al.
2002/0103018 A1 8/2002 Rommerdahl
2003/0083943 A1 * 5/2003 Adams et al. ................ 705/14
2004/0178582 A1 9/2004 Garrod
2005/0029744 A1 2/2005 Yoseloff et al.
2005/0051960 A1 3/2005 Snow
2005/0107148 A1 5/2005 Webb
2005/0218596 A1 * 10/2005 Adam et al. ................ 273/292

* cited by examiner

*Primary Examiner*—Benjamin H Layno
(74) *Attorney, Agent, or Firm*—Robert Ryan Morishita; Morishita Law Firm

(57) ABSTRACT

A method is disclosed for conducting a supplemental proposition wager on base games utilizing a plurality of community, or shared, cards. Optionally, supplemental proposition wagers may be placed by non-participants of the base game. Supplemental proposition wagers are placed before a set or subset of community cards are revealed. Supplemental proposition wagers are resolved by issuing rewards if the community cards form a winning composition.

15 Claims, 2 Drawing Sheets

PROPOSITION WAGER FOR A CARD GAME

RELATED APPLICATION DATA

The present application claims the priority of commonly owned U.S. Provisional Patent Application Ser. No. 60/684,004, entitled "Proposition Wager for a Card Game," filed May 23, 2005.

FIELD OF THE INVENTION

The present invention relates to the field of card games. Specifically, the present invention is a method for implementing a supplemental proposition wager on a card game that utilizes a plurality of community, or shared, cards on the composition of all, or a subset of, the community cards.

BACKGROUND OF THE INVENTION

There is a family of poker games known in the art in which a group of players use one or more shared, or community, cards, to form each player's hand. Among the games in this family are Texas Hold 'em and Omaha. These games are typically played solely in poker rooms by players competing for a player-funded pot. These games are thereby categorized as "player-banked" as it is the players' wagers which find the payout, i.e. the pot.

Another family of poker games allow players to only utilize the cards they receive individually, i.e. no community cards. As such, these games are more conducive to simple proposition wagers, wagers which do not involve competition with other participating wagerers, and which are rewarded according to a simple pay table. An example of a game in this family is draw poker, played in a variety of manifestations, including "Jacks or Better" and "Deuces Wild." While these games may be played as player-banked games, they are becoming increasingly popular as house-banked games, where pay outs are based on absolute results rather than relative results.

Games such as Texas Hold 'em and Omaha, as player-banked games, greatly favor experienced and expert players, those who are able to "read" other players, and play a more effective betting strategy utilizing bluff and intimidation. While this adds to the appeal of these games in poker rooms, or in poker tournaments, or even in television events, it lessens their appeal to the casual player and eliminates such games from the family of table games which may be played against the house. This also limits the universe of potential wagerers to those actually playing the game, i.e. sitting at the table in competition with the other players present.

A proposition wager on a game of burgeoning popularity, such as Texas Hold 'Em provides an opportunity for additional wagering activity, particularly among such individuals who are loathe to risk large amounts of money by competing with recognized experts. Giving a wagerer the opportunity to place a bet on the same deal as the recognized celebrities of poker without relying on the cards dealt an individual player, or on either their own wagering and bluffing skill or that of a participant, will elicit gaming activity, and hence income to the house, from those already playing, as well as from those who would otherwise be spectators.

SUMMARY OF THE INVENTION

The method of the present invention is a supplemental proposition wager made on a card game played with playing indicia. While the playing indicia could include tiles, a set or subset of playing cards, dice, numbers, bingo cards, or the like, in an optional embodiment, the playing indicia is a standard deck of playing cards. The present method could be applied to any base game utilizing a plurality of shared, or community, cards. Prior to revealing any community cards, players place a supplemental proposition wager on the composition of the community cards. Optionally, the player must be a participant in the base game to place a supplemental proposition wager; in an alternate optional embodiment, the player may be permitted to place a supplemental proposition wager without regard to whether the player is a participant in the base game. That is, a player of such an optional embodiment may place a supplemental proposition even if the player is not participating in the base game or if the player is participating in the base game without anything at stake, but wishes to play only the supplemental proposition wager.

The base game is conducted according to the rules of the base game. At a point during or after the base game after the community cards have been revealed, supplemental proposition wagers are resolved by comparing a set, subset, or subsets of the community cards, according to the optional embodiment employed, to a table of winning community card compositions. In an optional embodiment, this proposition wager is resolved exclusive of any non-community cards, whether distributed to any participant or not, but only on the community cards. If the set, subset, or subsets of community cards form a winning combination, players placing supplemental wagers are rewarded. If the base game has been interrupted to resolve the supplemental proposition wagers, the base game is completed.

DESCRIPTION

Figure 1:
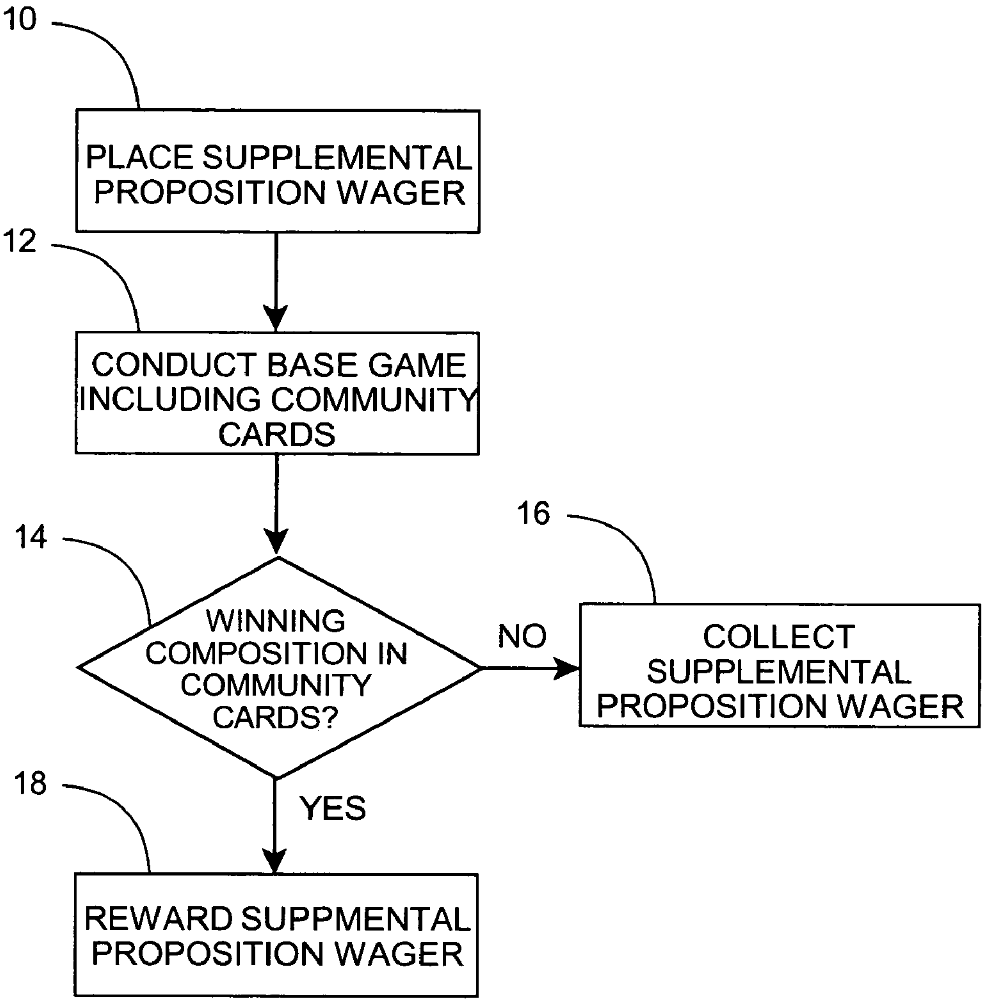
FIG. 1 is a flow chart of a method according to an embodiment of the present invention.

Reference is now made to the figures wherein like parts are referred to by like numerals throughout. As shown in FIG. 1, the present invention is a method of conducting a supplemental proposition wager on a base game utilizing community cards. It is noted that the present method could be applied to any game using community cards.

Figure 2:
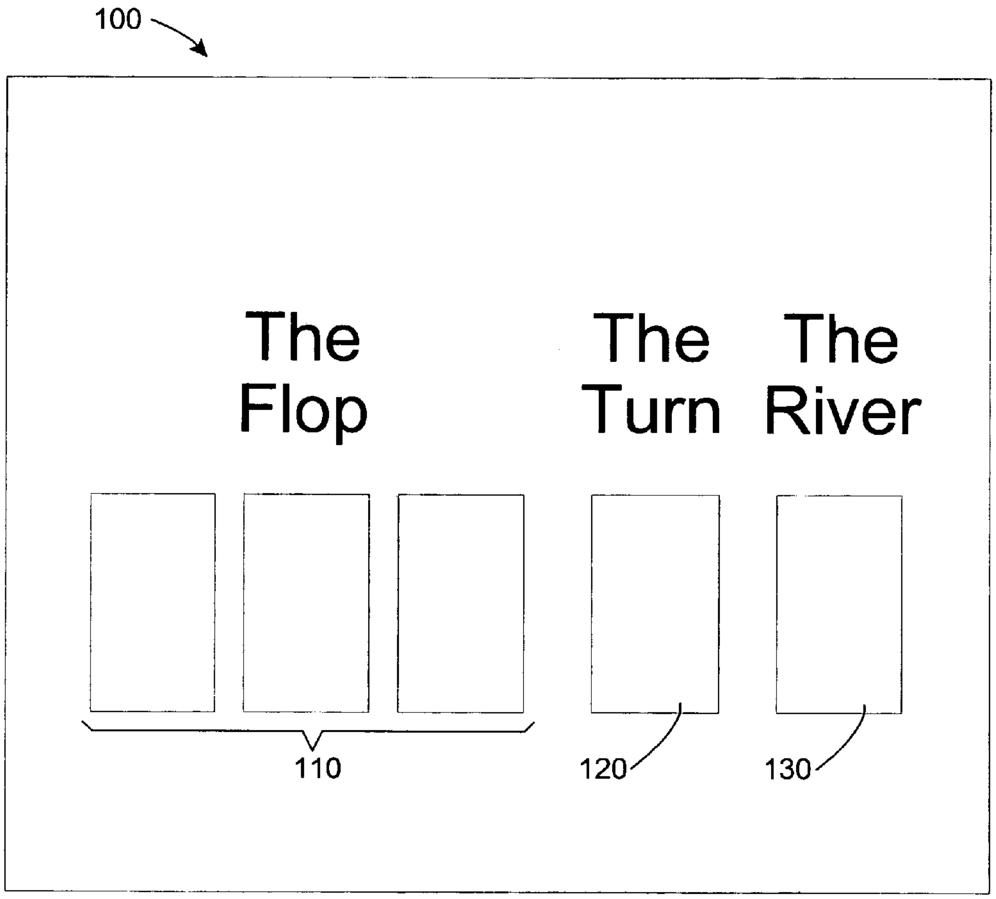
FIG. 2 is a top view of a layout of the community portion of the gaming table utilized for implementation of an embodiment of the present invention applied to a base game of Texas Hold 'em.

Since the present invention is applied to a base game, the supplemental proposition wager could be applied included on a layout used for the base game. For example, FIG. 2 illustrates an optional layout of the community area 100 in a "hold 'em" poker-type game such as Texas Hold 'em for revealing community cards in a card game. While the optional embodiment illustrated in FIG. 2 involves resolution of the supplemental proposition wager using the community cards in a Texas Hold 'em game, the present game could be applied to other types of "hold 'em" poker-type card games such as Omaha or Pineapple, or any other card game that involves the dealing or revealing of community, or shared, cards.

Returning to FIG. 1, the present invention includes the player placing 10 a supplemental proposition wager. In one optional embodiment, the player must be a player of the base game to place a supplemental proposition wager. However, the supplemental proposition wager may be conducted as a supplemental proposition wager on the base game, rather than a supplemental proposition wager within the base game itself. Thus, in another optional embodiment, any person may place a supplemental proposition wager, without regard to whether the person is a participant in the base game. For example, in such an optional embodiment, spectators of a base game may be permitted to place a supplemental proposition wager on one or more base games, even though the spectators are not otherwise participating in the base game or base games. In this regard, the present invention could be operated on multiple tables simultaneously and players may be permitted to place multiple simultaneous supplemental proposition wagers on different base games.

In yet another optional embodiment, players or spectators of a base game without a stake, i.e. base games played with fictional wagers, may be permitted to place a supplemental proposition wager using real wagers, i.e. wagers backed by real currency or other medium of exchange. For example, such an embodiment may be employed in an online embodiment in which players play a base game using fictional credits but players or spectators of that game place a "real" supplemental proposition wager. It is noted that in any of these optional embodiments, the present invention contemplates that non-participants in the base game may be permitted to place the supplemental proposition wager, such as through the Internet, even though those placing the supplemental proposition wager are not participating in, present at, or even watching the play of the base game. It is noted that this would apply without regard to whether the base game is played for a tournament prize, a pot, or any other form of prize.

In an optional embodiment, the player places a supplemental proposition wager and is not required to make any selection. In an alternate optional embodiment, the player may be required to make a selection in placing the supplemental proposition wager to identify the proposition wagered upon. For example, selections may include which of the community cards will be used to resolve the supplemental proposition wager, which compositions of community cards will be rewarded, or the like. In placing the supplemental proposition wager, the player may use separate bankrolls for the base game and the supplemental proposition wager. For example, if a player has an account of $800, the player may use $500 to bankroll the player's play of the base game (if he is participating in the base game) and the remaining $300 to bankroll any supplemental proposition wagers.

The base game is conducted 12 according to the base game rules and, at a point after at least a portion of the community cards are revealed, the supplemental proposition wagers are resolved. The point at which the supplemental proposition wagers are resolved may be during the conduct of the base game or may be after the base game is completed. It is noted that there may be reasons outside of the present invention for delaying the resolution of the supplemental proposition wagers for players playing the base game until after the base game is completed. For example, it may be desirable to resolve supplemental proposition wagers and base wager at a single stage of play rather than interrupting the base game to resolve the supplemental proposition wagers for players of the base game. However, this is a matter of choice only and is not essential to the present invention. Therefore, it is contemplated that the supplemental proposition wager could be resolved at any time after a sufficient quantity of community cards have been revealed. If the base game rules permit the base game to terminate prior to dealing community cards, or prior to dealing a sufficient quantity of community cards to resolve the supplemental proposition wagers, the supplemental proposition wagers may be handled in any of a variety of ways, including returning the supplemental proposition wager, collecting the supplemental proposition wager, carrying the supplemental proposition wager to the next hand, or any other handling of the supplemental proposition wager.

The supplemental proposition wager is resolved by comparing 14 a set of community cards, a subset of community cards, or multiple subsets of community cards to winning compositions. In an optional embodiment, the winning compositions are listed on a table. If the community cards designated for resolution of the supplemental proposition wager do not form a winning composition, the supplemental proposition wager may be collected 16. Conversely, if the community cards designated for resolution of the supplemental proposition wager form a winning composition, the supplemental proposition wager may be rewarded. Optionally, different pay outs are issued for different winning compositions. In such an optional embodiment, the different pay outs may be included on a table.

In the event that the supplemental proposition wager is resolved during the base game, the base game continues according to the base game rules.

For example, in the optional embodiment of FIG. 2, the base game is Texas Hold 'em in which five community cards are dealt. These community cards are dealt to a community area 100 with community card spaces 110, 120, 130. The community card spaces are separately identified as the flop community card spaces 110, the turn community card space 120, and the river community card space 130. That is, according to the rules of the base game Texas Hold 'em, after receiving ante wagers, dealing player hands of two cards each, and conducting an optional round of wagering, three community cards, referred to as the "flop" community cards, are dealt. As may be appreciated, in a game conducted using the optional community area 100 of FIG. 2, the flop community cards are dealt to the flop community card spaces 110. Another optional round of wagering is followed by dealing the "turn" community card to the turn community card space 120. The dealing of cards is completed after another optional round of wager by dealing the "river" community card to the river community card space 130. A final optional round of wagering is conducted and player hands are resolved against one another using the best possible combination of player hands and community cards.

The present method is applied to such a Texas Hold 'em base game by receiving one or more supplemental proposition wagers. As noted above, those players placing supplemental proposition wagers may or may not be participants in the base game, i.e. in an optional embodiment, the players may include non-participant spectators. While the supplemental proposition wager could be resolved based on any or all of the community cards, in the optional embodiment illustrated the supplemental proposition wager is placed on the "flop" community cards dealt to the flop community card spaces 110. In alternate optional embodiments, wagering can be on more, or less cards, or may be on community cards 1110, 120, 130 in other than the first three positions 110.

In the optional embodiment illustrated, a supplemental proposition wager is placed on the "flop" community cards. In an alternate embodiment, multiple supplemental proposition wagers may be placed on distinct designated sets and/or subsets of community cards. In yet another optional embodiment, the supplemental proposition wager may require the player to designate the proposition wagered upon, such as the set or subset of cards wagered upon or the outcomes that will result in a reward.

At some point after the community cards used to resolve the supplemental proposition wager have been revealed, the supplemental proposition wager is resolved. In the alternate embodiment illustrated, resolution of the supplemental wager is performed following the play of the underlying game. In an alternate embodiment, the resolution may be performed during the game, such as when the prespecified subset of the community cards, such as the "flop" in the example above, has been revealed.

The supplemental proposition wager is resolved by comparing the composition of the community cards to designated winning compositions. Thus, in the example, the "flop" community cards are compared to the designated winning community card compositions. Although not specifically illustrated in the figures, the winning community card compositions may vary according to a player designation. In an optional embodiment, the winning compositions are included in a table that also includes an associated pay out. If the set or subset of community cards, such as the "flop" in the example, do not form a winning composition, the supplemental proposition wager may be forfeit. However, if the set or subset of community cards form a winning composition, the supplemental proposition wager is rewarded. In an optional embodiment using a table of winning compositions and associated pay outs, winning supplemental proposition wagers are rewarded according to the table.

An example of a table for a game using playing cards is given in Table 1 below. It is noted that this table is exemplary only and should not be considered limiting. For example, in alternate optional embodiments, the pay outs could vary and/or additional or alternative holdings could be winning compositions. Further it is noted that in games using different playing indicia, such as tiles, numbers, dice, or other playing indicia, the winning compositions would, of course, list compositions formed from those playing indicia.

| Composition | Pay |
|---|---|
| One Pair | 1-1 |
| Flush | 4-1 |
| Straight | 6-1 |
| Three of a kind | 30-1 |
| Straight Flush | 40-1 |

While Table 1 lists combinations of cards based on rank and/or suit, it is contemplated that other characteristics of the cards may be used to identify winning compositions such as the color of the cards suits, e.g. red or black, the sum of the cards, the value of the cards, i.e. all cards under-7 or over-7 or all cards even or odd, or any other characteristic discernible from the set, subset, or subsets of community cards used to resolve the wagers. For example, in one embodiment of the present game applied to a hold 'em-type poker game such as Texas Hole 'em, a supplemental proposition wager may be placed on the "flop" community cards by any player including spectators and participants. The winning community card compositions include all-red, i.e. a proposition that the three "flop" community cards are diamonds, hearts, or a mixture thereof, or all-black, i.e. a proposition that the three "flop" community cards are spades, clubs, or a mixture thereof. While such a game could be conducted without player selection, in one optional embodiment, players select whether to place the supplemental proposition wager on all-red or all-black. Players are rewarded on their supplemental proposition wagers if the "flop" community cards have the selected color composition. If the "flop" community cards have a non-selected color composition or a composition of mixed red and black, the player's supplemental proposition wager is collected.

In alternate optional embodiments, multiple supplemental wagers may be accepted, to be separately resolved on distinct sets or subsets of the community cards. Such distinct subsets may be mutually exclusive or overlapping. In an optional embodiment, each subset may utilize a separate table of winning compositions and, optionally, associated pay outs. Optionally, where multiple such supplemental wagers are enabled, parlaying, i.e. combination wagering, may be permitted.

While certain embodiments of the present invention have been shown and described it is to be understood that the present invention is subject to many modifications and changes without departing from the spirit and scope of the invention presented herein.

We claim:

1. A method for conducting a supplemental proposition wager on a base game conducted for one or more participants using playing indicia that is conducted according to rules of said base game that include dealing at least one indicia to each participant and revealing one or more community indicia, comprising:

participants placing a base wager for participation in said base game;

players placing a supplemental proposition wager on the composition of the community indicia prior to dealing any community indicia, wherein said players placing a supplemental wager may opt whether to additionally be a participant in said base game such that said players may place said supplemental wager without placing said base wager;

conducting said base game for said participants according to said rules until at least a portion of said community indicia is revealed;

after revealing at least a portion of said community indicia, comparing a subset of fewer than all said community indicia to a predefined table of winning community indicium compositions;

rewarding players on said supplemental proposition wagers if said subset of fewer than all said community indicia form a winning community indicium compositions; and after said subset is revealed and after said rewarding of players on said supplemental proposition wager has occurred, continuing said base game by at least one of (a) revealing at least one additional community indicia and (b) dealing at least one additional indicia to participants in said base game.

2. The method of claim 1 wherein said step of comparing comprises comparing community indicia, exclusive of any indicia dealt to said participants, to said table of winning community indicium compositions.

3. The method of claim 1 wherein said table of winning community indicium compositions includes winning community indicium compositions using fewer than all community indicia revealed.

4. The method of claim 1 wherein said table of winning community indicium compositions includes a plurality of winning community indicium compositions, said method further comprising said player selecting one or more winning community indicium compositions when placing said supplemental proposition wager such that said player is rewarded only if the community indicia match a selected winning community indicium composition.

5. The method of claim 1 wherein participants have separate bank rolls for placing base wagers and supplemental proposition wagers.

6. The method of claim 1 in which participants may select to wager either fictional credits and real credits, wherein said base wager is placed using fictional credits and said supplemental proposition wager is placed using real credits.

7. A method for conducting a supplemental proposition wager on a base game conducted for one or more participants using playing cards that is conducted according to rules of said base game that include dealing at least one card to each participant and revealing one or more community cards, comprising:

participants placing a base wager for participation in said base game;

players placing a supplemental proposition wager on the composition of the community cards prior to dealing any community cards and without regard to whether a player is a participant in said base game such that said players may place said supplemental wager without placing said base wager;

conducting said base game for said participants according to said rules until at least a portion of said community cards is revealed;

after revealing at least a portion of said community cards, comparing a subset of fewer than all said community cards, exclusive of any cards dealt to said participants, to a predefined table of winning community card compositions;

rewarding players on said supplemental proposition wagers if said subset of fewer than all said community cards form a winning community card compositions; and after said subset is revealed and after said rewarding of players on said supplemental proposition wager has occurred, continuing said base game by at least one of (a) revealing at least one additional community card and (b) dealing at least one additional card to participants in said base game.

8. The method of claim 7 wherein said table of winning community card compositions includes winning community card compositions using fewer than all community cards revealed.

9. The method of claim 7 wherein said table of winning community card compositions includes a plurality of winning community card compositions, said method further comprising said player selecting one or more winning community card compositions when placing said supplemental proposition wager such that said player is rewarded only if the community cards match a selected winning community card composition.

10. The method of claim 7 wherein participants have separate bank rolls for placing base wagers and supplemental proposition wagers.

11. The method of claim 7 in which participants may select to wager either fictional credits and real credits, wherein said base wager is placed using fictional credits and said supplemental proposition wager is placed using real credits.

12. A method for conducting a supplemental proposition wager on a base game conducted for one or more participants using playing cards that is conducted according to rules of said base game that include dealing at least one playing card to each participant and revealing one or more community cards, comprising:

participants placing a base wager for participation in said base game;

players placing a supplemental proposition wager on the composition of the community cards prior to dealing any community cards, wherein at least one of said players is not a participant in said base game such that at least one of said players has placed said supplemental wager without placing said base wager;

conducting said base game for said participants according to said rules until at least a portion of said community cards is revealed;

after revealing at least a portion of said community cards comparing a subset of said community cards of fewer than all community cards and exclusive of any cards dealt to said participants, to a predefined table of winning community card compositions;

rewarding players on said supplemental proposition wagers if said subset of fewer than all said community cards form a winning community card compositions; and after said subset is revealed and after said rewarding of players on said supplemental proposition wager has occurred, continuing said base game by at least one of (a) revealing at least one additional community card and (b) dealing at least one additional card to participants in said base game.

13. The method of claim 12 wherein said table of winning community card compositions includes a plurality of winning community card compositions, said method further comprising said player selecting one or more winning community card compositions when placing said supplemental proposition wager such that said player is rewarded only if the community cards match a selected winning community card composition.

14. The method of claim 12 wherein participants have separate bank rolls for placing base wagers and supplemental proposition wagers.

15. The method of claim 12 in which participants may select to wager either fictional credits and real credits, wherein said base wager is placed using fictional credits and said supplemental proposition wager is placed using real credits.

* * * * *